US008770826B2

(12) United States Patent
Tamminga et al.

(10) Patent No.: US 8,770,826 B2
(45) Date of Patent: Jul. 8, 2014

(54) GEARBOX WITH BREATHER SYSTEM

(75) Inventors: Jakob Tamminga, Orton (CA); Gavin Mills, Hillsburgh (CA)

(73) Assignee: Jay-Lor International Inc., Orton, Ontario (CA)

(*) Notice: Subject to any disclaimer, the term of this patent is extended or adjusted under 35 U.S.C. 154(b) by 965 days.

(21) Appl. No.: 12/883,516

(22) Filed: Sep. 16, 2010

(65) Prior Publication Data

US 2012/0069700 A1      Mar. 22, 2012

(51) Int. Cl.
*B01F 7/24* (2006.01)

(52) U.S. Cl.
USPC ........... 366/314; 366/318; 366/323; 366/331; 366/603

(58) Field of Classification Search
USPC ........ 366/314, 318, 323, 331, 603; 74/412 R, 74/416, 417
See application file for complete search history.

(56) References Cited

U.S. PATENT DOCUMENTS

| | | | |
|---|---|---|---|
| 5,240,321 A | | 8/1993 | Miller |
| 5,429,436 A * | | 7/1995 | Stone .......................... 366/141 |
| 5,462,354 A | | 10/1995 | Neier |
| 5,615,839 A | | 4/1997 | Hartwig |
| 5,803,375 A | | 9/1998 | Hartwig |
| 5,863,122 A | | 1/1999 | Tamminga |
| 5,929,394 A | | 7/1999 | Westerbeke, Jr. |
| 7,341,372 B2 * | | 3/2008 | Van Der Plas ................ 366/141 |
| 7,484,437 B2 * | | 2/2009 | Brunazzi et al. ............. 74/810.1 |
| 2001/0038573 A1 * | | 11/2001 | Knight ........................... 366/141 |
| 2005/0172741 A1 * | | 8/2005 | Van Der Plas .............. 74/336 R |
| 2006/0256647 A1 * | | 11/2006 | Van Der Plas ................ 366/141 |

FOREIGN PATENT DOCUMENTS

| | | |
|---|---|---|
| CA | 2050630 | 3/1993 |
| CA | 2050631 | 3/1993 |
| CA | 2152193 | 1/1996 |
| CA | 2246390 | 1/1996 |
| CA | 2182909 | 2/1997 |
| CA | 2180997 | 11/1998 |
| CA | 2485287 | 5/2006 |

* cited by examiner

*Primary Examiner* — David Sorkin
(74) *Attorney, Agent, or Firm* — Dilworth & Barrese, LLP.

(57) ABSTRACT

A gearbox is provided having an integrated breather system. The output shaft of the gearbox has integrated therein a breather bore with a top port in the top end of the output shaft and a bottom end in the side of the output shaft. The top end is in communication with the atmosphere while the bottom end is in communication with the inner oil reservoir of the gearbox. By incorporating the breather directly into the output shaft, air locking is reduced or even prevented. Further, the distance between the maximum and minimum oil fill levels is increased thereby allowing for a reduction in accidental over or under filling of the gearbox. In addition, accidental spillage of oil into the environment is reduced as the top breather port exists on top of the gearbox and may optionally include a breather line extending further upward. The reduction in air locking allows for increased accuracy in oil filling as well as reduced maintenance on the gearbox.

12 Claims, 5 Drawing Sheets

FIG 2 (PROIR ART)

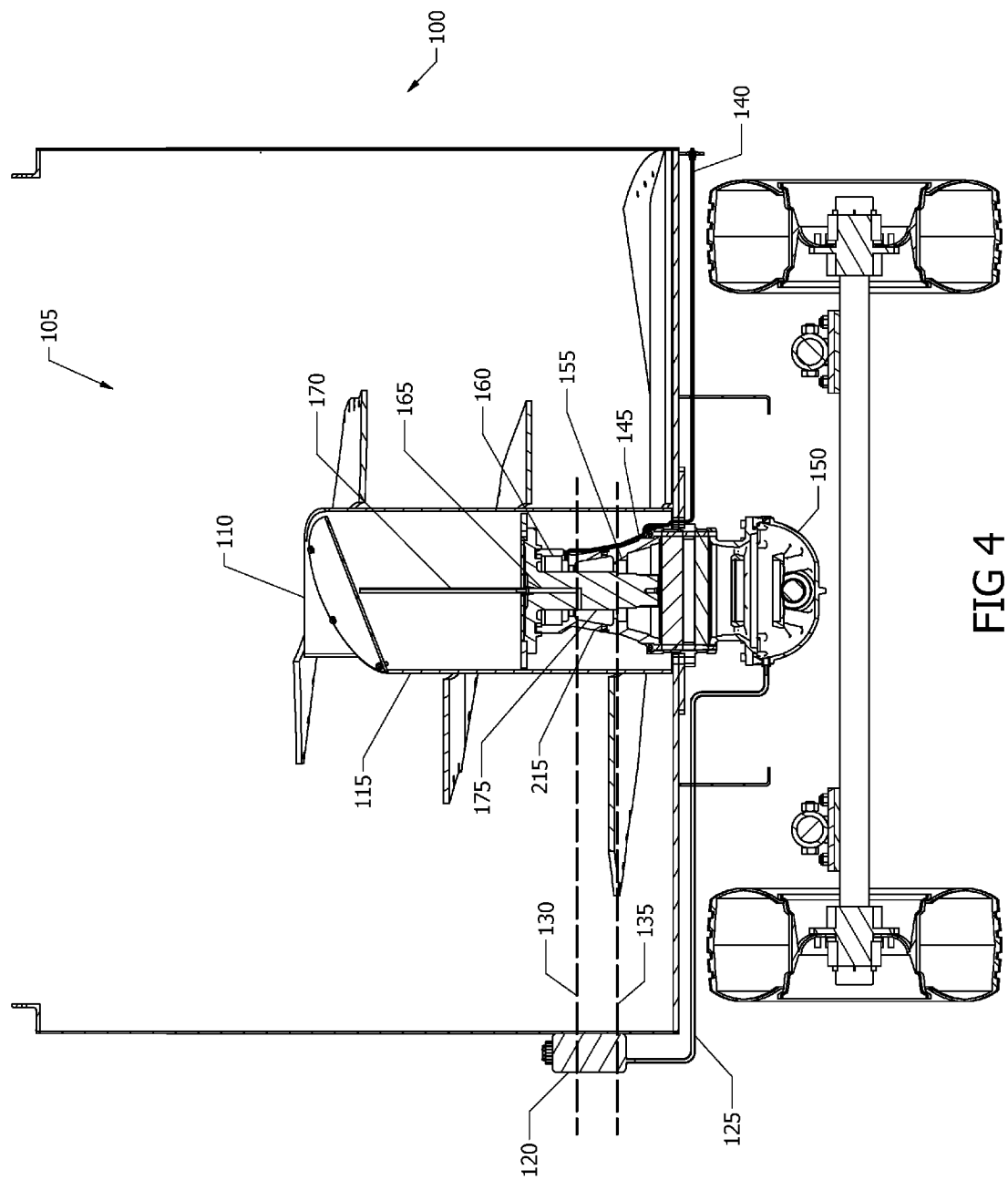

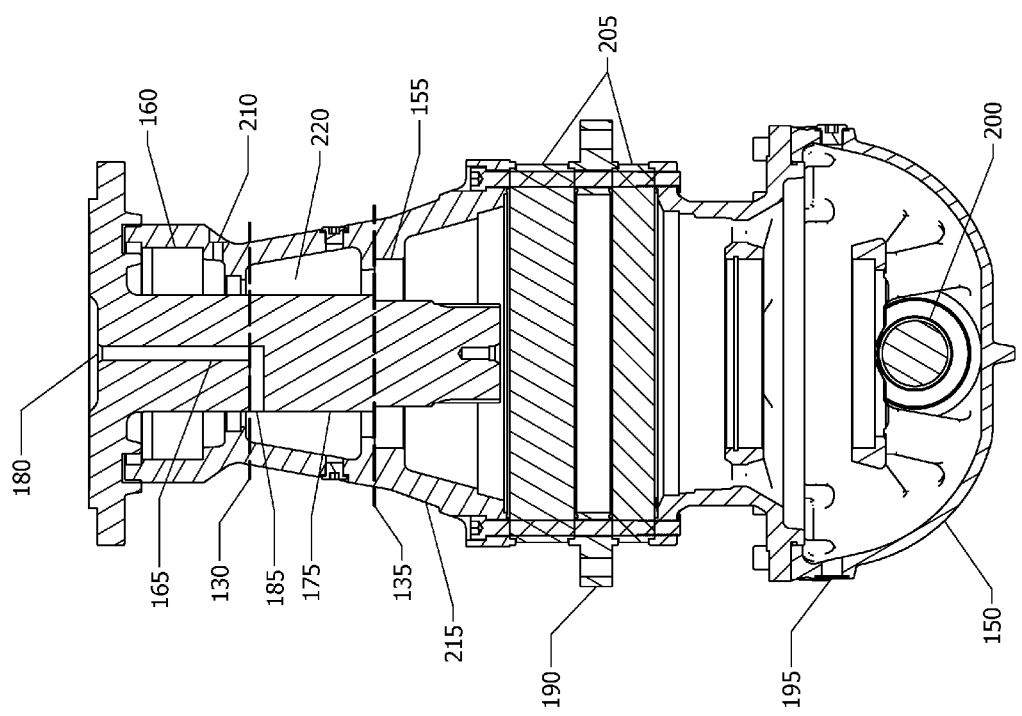

GEARBOX WITH BREATHER SYSTEM

FIELD OF THE INVENTION

The invention relates to gearboxes and more specifically to breather systems for the lubrication systems of gearboxes in vertical mixers.

BACKGROUND

In general, vertical mixers for mixing and/or cutting bulk material use an auger positioned in a mixing chamber to mix and optionally cut the bulk material for output. The auger is generally powered using a motor provided by a separate vehicle, such as a tractor via a power takeoff. Regardless of power supply, a transmission or gearbox is used to transfer the output force from the motor to the auger. The gearbox comprises a plurality of gears, an output shaft and a number of bearings, all of which require lubrication using either oil or grease provided by a gearbox lubrication system. Typically, the gearbox is mounting in the floor of the mixing chamber and oriented in a vertical position within the auger tube of the auger. Two main current systems for oil lubrication are:
1) Open loop system shown in FIGS. 1; and
2) Closed loop system showing in FIGS. 2 and 3.

Both systems make use of an external oil reservoir 30 with an oil fill line 35 that runs from the bottom of the oil reservoir 30 to the bottom of the gearbox 40. The open loop system leaves the upper breather port 85 of the gearbox 40 open to the environment and relies on the assumption that the oil level in the gearbox 40 will always stay below the level of the upper breather port 85. This level is referred to as the maximum oil level 70. This works in theory but becomes a problem in practice when you consider the location of the upper breather port 85. In general, the upper breather port 85 of the gearbox 40 sits only about 1.5" above the upper oil lubricated roller bearing 55. This level is referred to as the minimum oil level 65. Since oil is needed to lubricate the upper roller bearing, the bearing should always be covered in oil and therefore the oil level fluctuation range is very small. It is therefore prudent that the fill level on the external reservoir 30 be placed at the same level as the breather port 85 on the gearbox 40 so that operator's do not risk letting the oil level fall below the upper roller bearing 55. This then becomes a problem because if the reservoir 30 is full, it is very likely that the oil level in the gearbox 40 is at or above the breather port 85, meaning the gearbox 40 may easily become air locked. Also, once the oil reaches the breather port 85, it is also likely that it will spill out of the gearbox 40 and possibly contaminate the environment. To deal with the spillage issue, it is possible to install a breather pipe 80 to the breather port 85. The breather pipe 80 is typically an elbow fitting with a short section of pipe extending upwards. If the oil reaches the breather port 85, it then has to travel up the pipe 80 before it can spill out of the gearbox 40. One problem associated with this arrangement and breather pipes in general, is that once the oil begins to travel up the pipe, the gearbox becomes air locked. Air locking of the gearbox typically occurs when the oil heats up and expands thereby increasing the oil level in the gearbox above the breather port 85. Oil then enters the breather pipe 80 and settles in a low point of the pipe 80. Once the oil contracts, any oil at a low point in the pipe is effectively stuck in the pipe and prevents air from venting from the gear box. The air locked gearbox is then prone to insufficient lubrication as well as inaccurate oil fill readings.

The closed loop system combats the spillage issue by running a return line 37 from the breather port 85 back to the top of the external reservoir 30. Therefore, if the oil level 15 inside the gearbox 40 reaches the level of the breather port 85, instead of spilling into the surrounding environment it will instead return to the external reservoir 30. However, the problem with air locking is still an issue with the closed loop system as oil spills into the return line 37 to a certain level 90. Further, because it is necessary to run the return line 37 externally between the gearbox casing and auger tube 25, there becomes a chance that the line 37 may be torn or damaged during operation, thus allowing oil to spill into the environment and allowing the gearbox 40 to seize. Closed loop systems although better for combating spillage are more prone to air locking as the return line typically includes a portion that is lower than the breather port 85 and therefore encourages the likelihood of air locking the gearbox.

A further problem associated with both the open loop and closed loop system is that the oil level 15 inside the gearbox 40 can surpass the maximum level in a number of instances. For example, the oil reservoir 30 may be overfilled 16. Accidental over or under filling is easily done as the difference between the maximum and minimum oil level is small and accuracy of filling is low. The oil level may also surpass the maximum level if the gearbox may be inclined during use, again partially because the difference between the maximum and minimum oil level is small.

With regard to the grease lubrication system, one existing problem is with the grease fill line 45 being run externally between the gearbox casing and the auger tube 25. Only the top roller bearing 50 is greased, because it cannot be lubricated by oil. The top roller bearing 50 cannot be lubricated by oil because its proximity to the top of the gearbox 40 makes it essentially impossible to fit a breather in this region. Further it is difficult to ensure that the bearing 50 would remain submerged in oil at all times. As a result, grease is used to lubricate the top roller bearing via a grease fill line run 45 external the gearbox 40. However, by running a grease line 45 between the gearbox casing and the auger tube 25, there becomes a chance that the line 45 may be torn or damaged during operation, thus starving the upper bearing 50 of lubrication and possibly causing major damage to the gearbox 40 over time. Typically, a grease line protector weldment 60 is used to protect the grease line 45.

Cold weather can further increase the likelihood of damaging either of the grease fill line 45 or the oil fill line 35 as frost build up inside the auger tube can cause the lines to freeze to the auger tube and break.

A need therefore exists to provide a gearbox system have a lubrication system comprising a breather that overcomes or mitigates at least one of the problems associated with gearboxes as outlined above or as known in the art.

SUMMARY

A gearbox is provided having an integrated breather system. The output shaft of the gearbox has integrated therein a breather bore with a top port in the top end of the output shaft and a bottom end in the side of the output shaft. The top end is in communication with the atmosphere while the bottom end is in communication with the inner oil reservoir of the gearbox. By incorporating the breather directly into the output shaft, air locking is reduced or even prevented. Further, the distance between the maximum and minimum oil fill levels is increased thereby allowing for a reduction in accidental over or under filling of the gearbox. In addition, accidental spillage of oil into the environment is reduced as the top breather port exists on top of the gearbox and may optionally include a breather line extending further upward. The reduction in air locking allows for increased accuracy in oil filling as well as reduced maintenance on the gearbox.

One illustrative embodiment provides for a gearbox for vertical orientation for driving an auger in a vertical mixer, the gearbox comprising:
- an input interface for receiving power output from a power source;
- gearing in communication with the input interface;
- an output shaft in communication with the gearing for outputting power via the top of the gearbox to the auger;
- an oil lubricated bearing for guiding the output shaft;
- an internal oil reservoir in fluid communication with the gearing, the output shaft and the oil lubricated bearing wherein a minimum oil fill level at least covers the oil lubricated bearing; and
- a breather bore extending through the output shaft and exiting the top of the output shaft via a top port and exiting a side of the output shaft via a bottom port, the bottom port in fluid communication with the internal oil reservoir,
- wherein a maximum oil fill level is above the minimum oil fill level.

In another embodiment of the gearbox as outlined above, the maximum oil fill level is above the bottom port of the breather bore.

In another embodiment of the gearbox as outlined above, the maximum oil fill level is at the top of the internal oil reservoir.

In another embodiment of the gearbox as outlined above, the gearbox further comprises a breather line extending upwards from the top port.

In another embodiment of the gearbox as outlined above, the gearbox further comprises an external oil reservoir and an oil fill line in communication between the external oil reservoir and the internal oil reservoir, the external reservoir situated such that the bottom of the external reservoir is below the minimum oil fill level and the top of the reservoir is above the maximum oil fill level.

In another embodiment of the gearbox as outlined above, the gearbox further comprises an external oil reservoir mounted above the top port, the external reservoir in fluid communication with the top port such that oil is delivered to the internal oil reservoir via gravity, and wherein the maximum oil fill level is above the top port.

In another embodiment of the gearbox as outlined above, the gearbox further comprises an internal grease passage in the gearbox casing, the internal grease passage in fluid communication with a grease lubricated bearing positioned towards the top of the output shaft and a grease port positioned proximate the bottom of the gearbox.

In one illustrative embodiment of a vertical mixer, the vertical mixer comprises:
- a mixing chamber defined by a floor and upending wall, the mixing chamber for receiving bulk material;
- a vertical auger for mixing the bulk material, the vertical auger including a hollow auger tube with flighting affixed thereto;
- a gearbox for driving the auger, the gearbox vertically mounted through the floor of the mixing chamber and including a top portion captured within the auger tube and a bottom portion extending below the floor, the gearbox comprising:
  - an input interface for receiving power output from a power source;
  - gearing in communication with the input interface;
  - an output shaft in communication with the gearing for outputting power via the top of the gearbox to the auger;
  - an oil lubricated bearing for guiding the output shaft;
  - an internal oil reservoir in fluid communication with the gearing, the output shaft and the oil lubricated bearing wherein a minimum oil fill level at least covers the oil lubricated bearing; and
  - a breather bore extending through the output shaft and exiting the top of the output shaft via a top port and exiting a side of the output shaft via a bottom port, the bottom port in fluid communication with the internal oil reservoir,
  - wherein a maximum oil fill level is above the minimum oil fill level.

In another embodiment of the vertical mixer as outlined above, the maximum oil fill level is above the bottom port of the breather bore.

In another embodiment of the vertical mixer as outlined above, the maximum oil fill level is at the top of the internal oil reservoir.

In another embodiment of the vertical mixer as outlined above, the vertical mixer further comprises a breather line extending upwards from the top port into the auger tube.

In another embodiment of the vertical mixer as outlined above, the input interface and an oil fill port in fluid communication with the internal oil reservoir are positioned below the floor of the mixing chamber.

In another embodiment of the vertical mixer as outlined above, the vertical mixer further comprises an external oil reservoir and an oil fill line in communication with the internal reservoir, the external reservoir situated such that the bottom of external reservoir is below the minimum oil fill level and the top of the external reservoir is above the maximum oil fill level.

In another embodiment of the vertical mixer as outlined above, the vertical mixer further comprises an external oil reservoir mounted above the top port and within the auger tube, the external reservoir in fluid communication with the top port such that oil is delivered to the internal oil reservoir via gravity, and wherein the maximum oil fill level is above the top port.

In another embodiment of the vertical mixer as outlined above, the vertical mixer further comprises an internal grease passage in the gearbox casing, the internal grease passage in fluid communication with a grease lubricated bearing positioned towards the top of the output shaft and a grease port positioned proximate the bottom of the gearbox.

BRIEF DESCRIPTION OF THE DRAWINGS

FIG. 4 is a schematic illustrative of an embodiment of a lubrication system having a breather system integrated into the output shaft of a gearbox mounted vertically in an auger in a mixing chamber of a vertical mixer; and FIG. 5 is a schematic illustrative of an embodiment of a gearbox including an integrated breather system in the output shaft of the gearbox.

DETAILED DESCRIPTION

Figure 1:
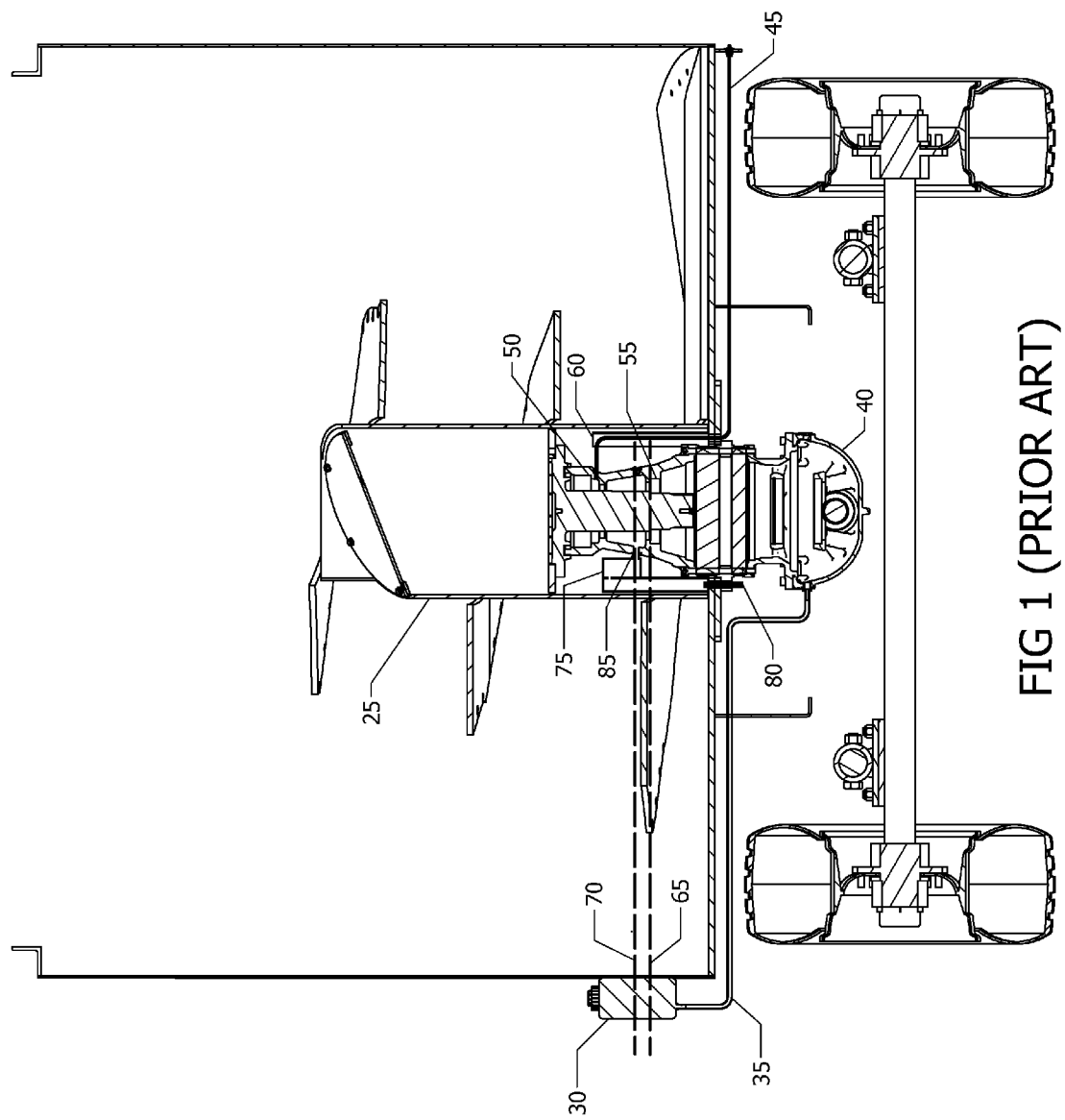
FIG. 1 is a schematic of a prior art embodiment of an open loop oil lubrication system for a gearbox mounted vertically in an auger in a mixing chamber of a vertical mixer.
Figure 2:
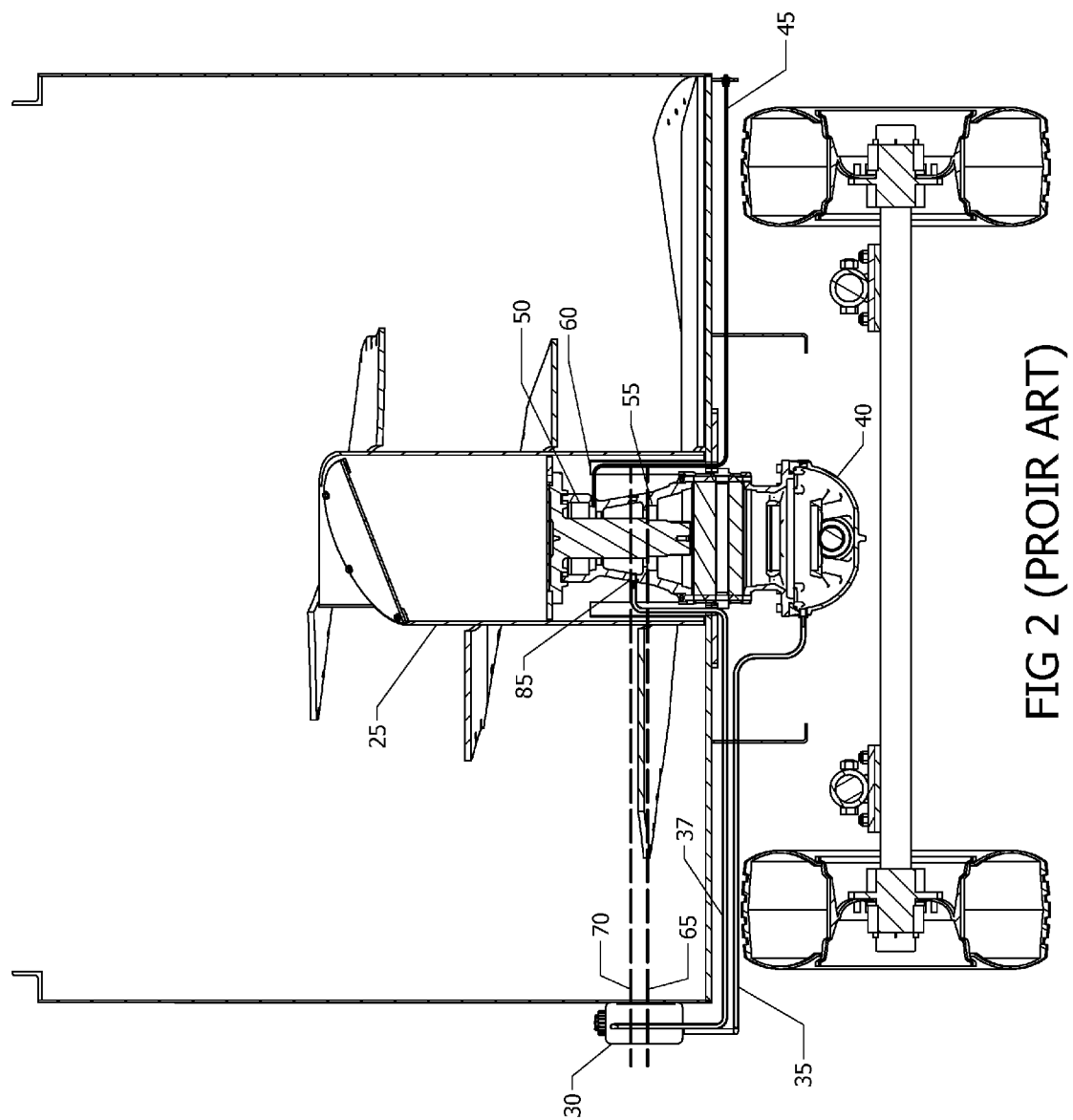
FIG. 2 is a schematic of a prior art embodiment of a closed loop oil lubrication system for a gearbox mounted vertically in an auger in a mixing chamber of a vertical mixer.
Figure 3:
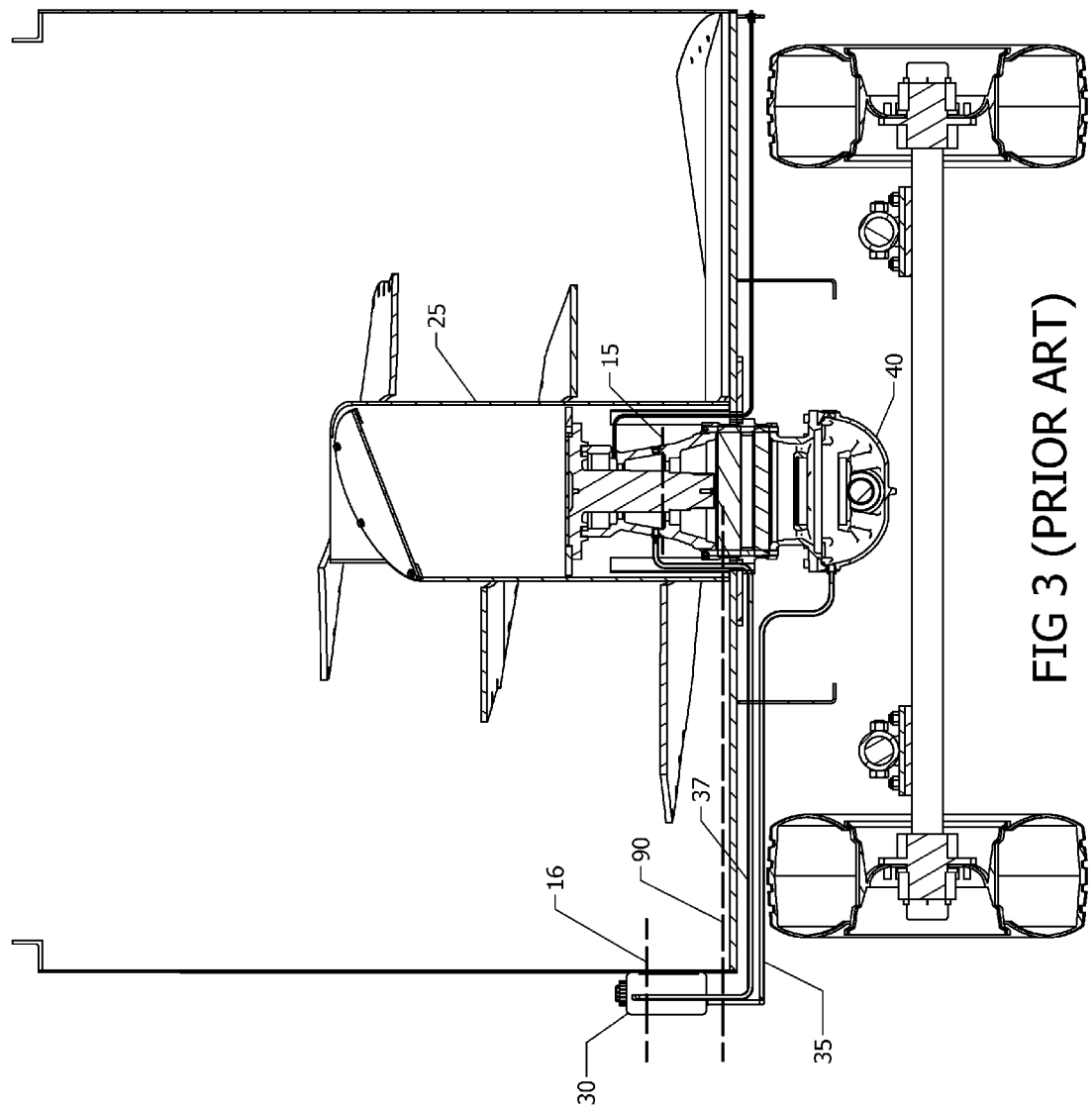
FIG. 3 is a schematic of the closed loop oil lubrication system shown in FIG. 2 with an air locked breather line.

FIG. 4 shows a schematic illustrative of one embodiment of a gearbox 150 including a lubricating system with an integrated breather for a vertical mixer 100. The gearbox 150 is typically mounted through the floor of a mixing chamber 105 such that power to be transferred from a power source to the auger 110 is input to the gearbox 150 in a bottom portion below the floor and is output through the top of the gearbox 150 via the output shaft 175. An upper portion of the gearbox 150 is captured within an auger tube 115 of an auger 110 in the vertical mixer 100. The output shaft 175 is operatively connected to the auger 110. As will be appreciated, power is transferred through gearing in the gearbox 150 to obtain a suitable ratio for use.

FIG. 5 shows a cross-sectional schematic view illustrative of one embodiment of a gearbox 150 for use with a vertical mixer, for example, as shown in FIG. 4.

With reference to FIGS. 4 and 5, to guide the output shaft 175, the gearbox 150 includes an oil lubricated roller bearing 155. The oil lubricated roller bearing 155 guides a region such as the lower and/or middle region of the output shaft 175. Oil is used to lubricate the oil lubricated roller bearing 155 in addition to the gearing components 205 as well as the components of the input interface 200 where power is input from the exterior power source. An oil fill port 195 is used to input oil from an oil reservoir 120. A minimum oil level 135, in the inner oil reservoir 220, sufficient to provide lubrication of the oil lubricated roller bearing 155 should be observed. A maximum oil level 130, above the minimum oil level 135, is effectively determined by the positioning of the breather system in the gearbox. The breather system comprises a bore 165 integrated into the output shaft 175. The breather bore 165 has a top port 180 located in the top end of the output shaft 175 for communication with the atmosphere. A bottom port 185 in the side of the output shaft 175 communicates with the inner oil reservoir 220. The maximum oil level 130 may be at or even above the bottom port 185. As the breather bore 165 extends upward from the inner oil reservoir 220 through the output shaft 175 and into the atmosphere there is no region in the bore that is below the bottom port 185 and therefore air locking is prevented no matter how high the oil level is in the inner oil reservoir 220. This feature allows for greater flexibility in filling the gearbox 150 with oil, allows for more components to be lubricated using oil in the inner oil reservoir 220 and further allows for those components to be better lubricated as, even when on an incline, the increased oil level has a greater chance of keeping components, such as the oil lubricated roller bearing 155, at least partially submerged in oil. In order to increase usability and reduce the chance of overfilling or underfilling of the gearbox oil level, the distance between the top of the oil lubricated roller bearing 155 and the bottom port 185 should be increased and/or maximised within the inner oil reservoir 220 as shown FIG. 5.

In connection with the oil supply in the gearbox 150 is the external oil reservoir 120 in communication with the oil fill port 195 via the oil fill line 125. The oil reservoir 120 should have a height at least equivalent to the distance between the minimum oil level 135 and the maximum oil level 130 to allow for more accurate filling. Further, as the oil is provided by gravity and not using an oil pump, the oil reservoir should be positioned at a height which spans the minimum and maximum oil levels. In this way, a visual indicator may be used to determine the minimum and maximum oil levels relative the actual oil level and the level may be adjusted accordingly. Because the breather is integrated directly into the output shaft 175 which is in atmospheric communication with the internal oil reservoir 220 and does not contain a region lower than the bottom port 185 air locking is prevented. As a result, expansion of the oil by heating during operation will not result in air locking. The oil level indicated in the external oil reservoir 120 has an increased accuracy as air is not locked in the oil line. A breather line 170 may be added to the top port 180 extending upwards to reduce oil spillage. By extending upwards, air locking is also prevented.

In an alternative embodiment, the external oil reservoir may be position above the output shaft 175 in fluid communication with the top port 180 of the breather bore 165. The external oil reservoir may be captured within the auger tube 115. In this embodiment, gearbox 150 and external reservoir may be sealed without the need for an external port so long as pressure build up within the gearbox due to expansion is allowed for within the external reservoir.

With the integrated breather bore 165, even in the event that the gearbox 150 is filled with oil above the maximum oil level 130, the system will not become air locked because the breather port 165 exits upwards out the top of the output shaft 175 and does not require a return line or extension line that includes a region including a low point, lower than the bottom port 185. By reducing air locking, oil fill accuracy is increased which reduces maintenance and failure on the gearbox 150.

As is commonly used, a grease lubricated roller bearing 160 is used to guide the upper section of the output shaft 175. Grease is typically used to lubricate the upper roller bearing 160 as it is too close to the top of the gearbox 150 to use oil as a breather cannot be used in such close proximity to the top of the gearbox 150. A grease fill port 210 situated in proximity and in communication to the grease lubricated roller bearing 160 is used to input grease to lubricate the upper bearing 160. In one embodiment, the grease fill port is adjacent the roller bearing 160.

A grease fill line 140 in communication with the grease fill port 210 is used to provide grease to the grease lubricated bearing 160. In order to reduce the chance of the grease fill line 140 being damaged by the auger 110 or auger tube 115, the grease fill line 140 may be made from rigid tubing. Further, the mounting section of the line 140 within the auger tube 115 may be formed to follow the contour of the gearbox casing 215. This removes the requirement for a line protector weldment within the auger tube 115. In this way, the risk of frost freezing the grease fill line 140 to the inside of the auger tube is reduced.

In a further embodiment, the grease fill line 140 may connect to a port located on the bottom of the gearbox 150 external the floor of the vertical mixer 100. A bubble defining an internal passage in the gearbox casing 215 is incorporated into the casting of the casing 215 such that grease is transferred via the internal passage from the connecting port up to the greased bearings.

The gearbox 150 and lubricating system outlined above has reduced tubing relative previous models. Further, the integrated breather system prevents air locking and results in a reduction in plumbing. Further, by increasing the distance between the minimum oil fill level 135 and the maximum oil fill level 130 the chance of under or over filling the oil reservoir 220 is decreased and accuracy of filling is increased and gearbox failures are decreased.

One skilled in the art will appreciate that the gearbox 150 comprises components including gearing, clutch components, etc., as necessary to transfer power from the power source to the output shaft 175 of the gearbox 150 to obtain a suitable ratio and operability. These components are included within the gearing components 205 and the input interface 200.

It will be appreciated that the term vertical as used herein refers to vertical mounting as opposed to horizontal mounting and is not intended to means precisely vertical but is merely used to differentiate horizontal gearbox systems from vertical gearbox systems. Further, although the gearbox 150 is exemplified using a vertical mixer 100 with a mixing chamber 105, it will be appreciated that the gearbox 150 may be used in other applications that necessitate the vertical orientation of the gearbox 150.

The present invention has been described with regard to a plurality of illustrative embodiments. However, it will be apparent to persons skilled in the art that a number of variations and modifications can be made without departing from the scope of the invention as defined in the claims.

We claim:

1. A vertical mixer for mixing bulk material, the vertical mixer comprising:
    a mixing chamber defined by a floor and upending wall, the mixing chamber for receiving bulk material;
    a vertical auger for mixing the bulk material, the vertical auger including a hollow auger tube with flighting affixed thereto;
    a gearbox for driving the auger, the gearbox vertically mounted through the floor of the mixing chamber and including a top portion captured within the auger tube and a bottom portion extending below the floor, the gearbox comprising:
    an input interface for receiving power output from a power source;
    gearing in communication with the input interface;
    an output shaft in communication with the gearing for outputting power via the top of the gearbox to the auger;
    an oil lubricated bearing for guiding the output shaft;
    an internal oil reservoir in fluid communication with the gearing, the output shaft and the oil lubricated bearing wherein a minimum oil fill level at least covers the oil lubricated bearing; and
    a breather bore extending through the output shaft and exiting the top of the output shaft via a top port and exiting a side of the output shaft via a bottom port, the bottom port in fluid communication with the internal oil reservoir,
    wherein a maximum oil fill level is above the minimum oil fill level.

2. The vertical mixer of claim 1, wherein the maximum oil fill level is above the bottom port of the breather bore.

3. The vertical mixer of claim 1, wherein the maximum oil fill level is at the top of the internal oil reservoir.

4. The vertical mixer of claim 1 further comprising a breather line extending upwards from the top port into the auger tube.

5. The vertical mixer of claim 1, wherein the input interface and an oil fill port in fluid communication with the internal oil reservoir are positioned below the floor of the mixing chamber.

6. The vertical mixer of claim 1 further comprising an external oil reservoir and an oil fill line in communication with the internal reservoir, the external reservoir situated such that the bottom of external reservoir is below the minimum oil fill level and the top of the external reservoir is above the maximum oil fill level.

7. The vertical mixer of claim 1 further comprising an external oil reservoir mounted above the top port and within the auger tube, the external reservoir in fluid communication with the top port such that oil is delivered to the internal oil reservoir via gravity, and wherein the maximum oil fill level is above the top port.

8. The vertical mixer of claim 1 further comprising an internal grease passage in the gearbox casing, the internal grease passage in fluid communication with a grease lubricated bearing positioned towards the top of the output shaft and a grease port positioned proximate the bottom of the gearbox.

9. The vertical mixer of claim 2, wherein the maximum oil fill level is at the top of the internal oil reservoir.

10. The vertical mixer of claim 3 further comprising a breather line extending upwards from the top port.

11. The vertical mixer of claim 9 further comprising a breather line extending upwards from the top port.

12. The vertical mixer of claim 11 further comprising an external oil reservoir and an oil fill line in communication between the external oil reservoir and the internal oil reservoir, the external reservoir situated such that the bottom of the external reservoir is below the minimum oil fill level and the top of the reservoir is above the maximum oil fill level.

* * * * *